Figure 1:
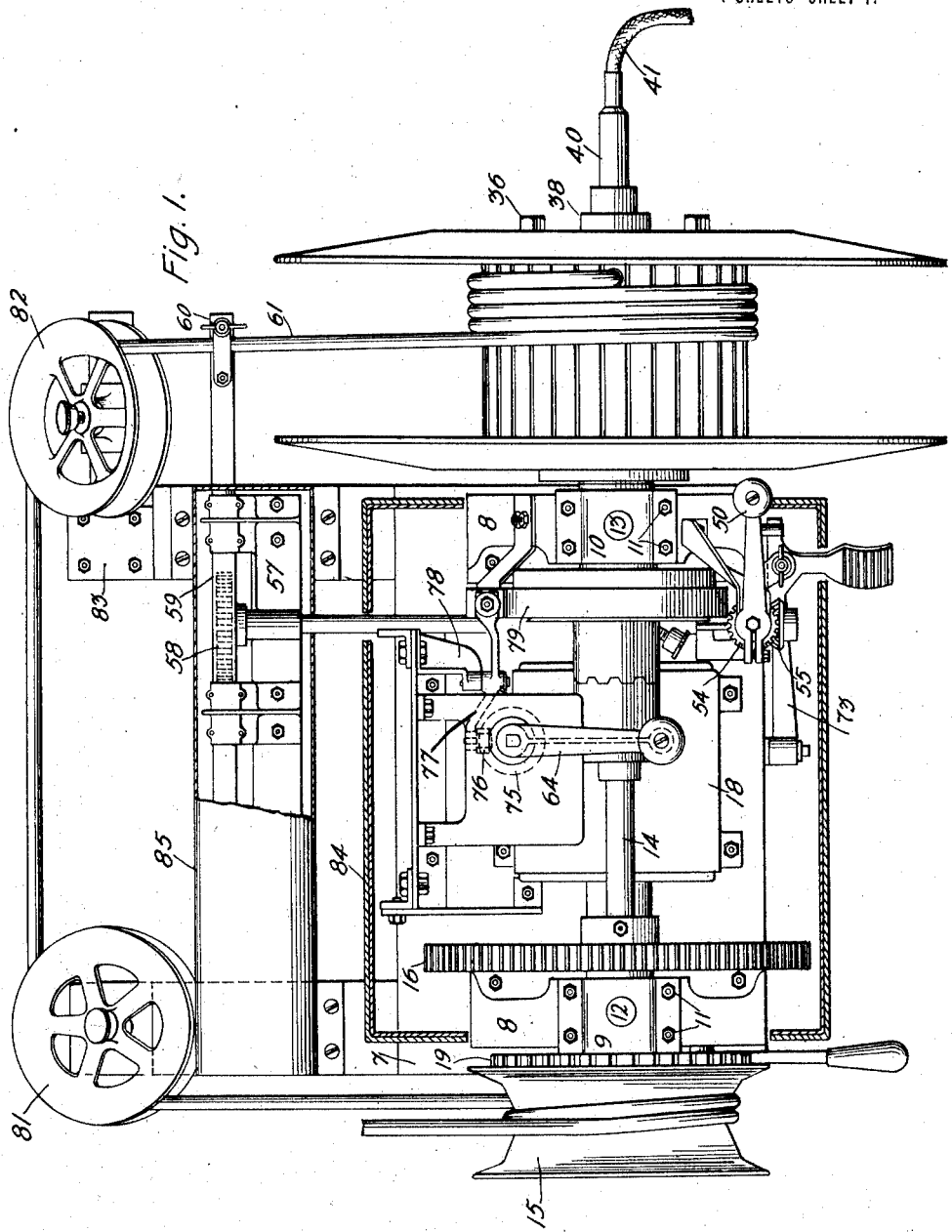

G. F. ATWOOD.
CABLE REELING APPARATUS.
APPLICATION FILED JUNE 24, 1919.

1,396,721.

Patented Nov. 15, 1921.
4 SHEETS—SHEET 1.

Inventor:
George F. Atwood.
by J. E. Roberts Att'y.

G. F. ATWOOD.
CABLE REELING APPARATUS.
APPLICATION FILED JUNE 24, 1919.

1,396,721.

Patented Nov. 15, 1921.
4 SHEETS—SHEET 2.

Inventor:
George F. Atwood.
by J. G. Roberts Att'y.

G. F. ATWOOD.
CABLE REELING APPARATUS.
APPLICATION FILED JUNE 24, 1919.

1,396,721.

Patented Nov. 15, 1921.
4 SHEETS—SHEET 3.

Inventor:
George F. Atwood.
by J. E. Roberts Att'y.

G. F. ATWOOD.
CABLE REELING APPARATUS.
APPLICATION FILED JUNE 24, 1919.
1,396,721.
Patented Nov. 15, 1921.
4 SHEETS—SHEET 4.
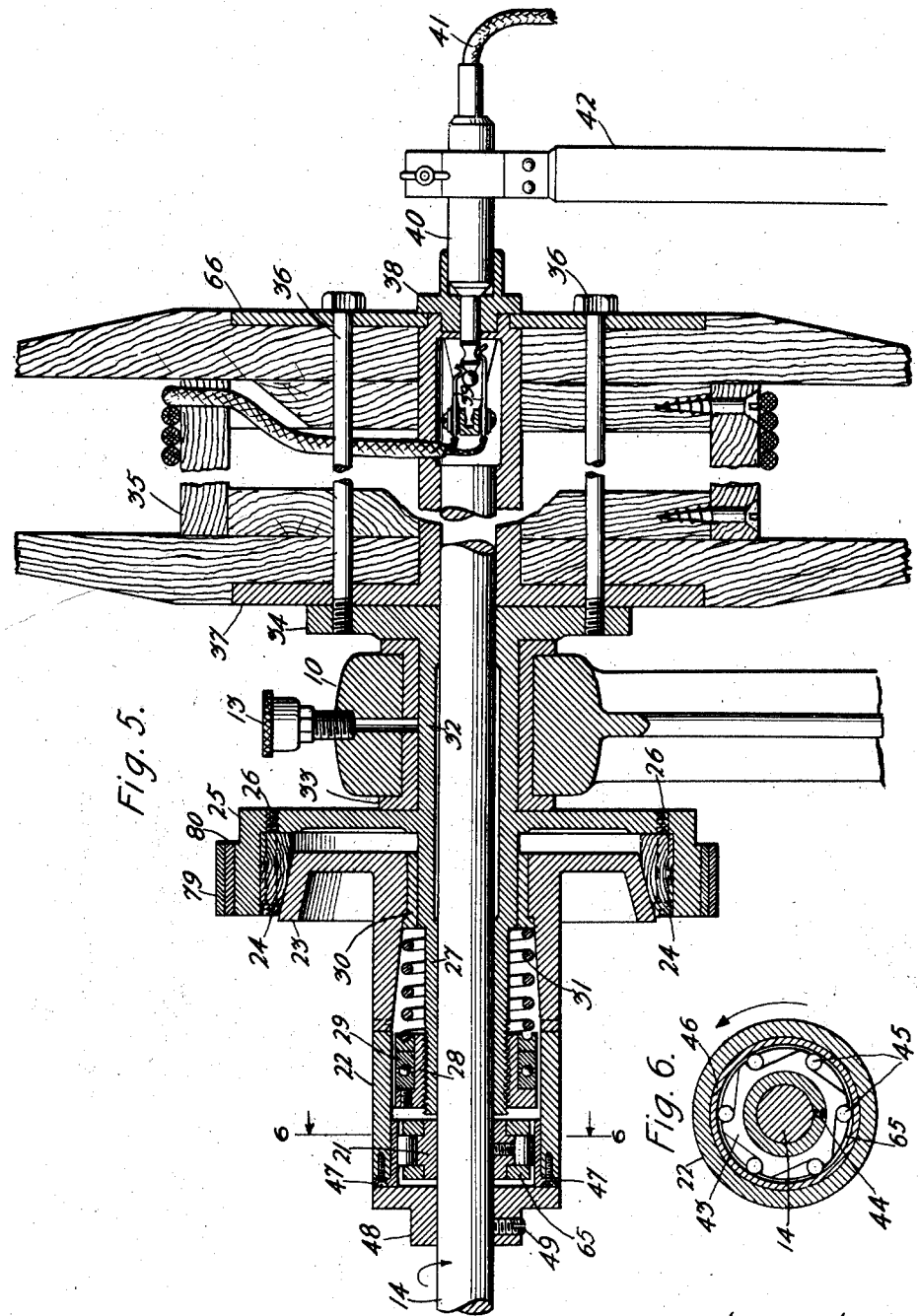
Inventor:
George F. Atwood.
by J. E. Roberts Att'y.

UNITED STATES PATENT OFFICE.

GEORGE F. ATWOOD, OF NEWARK, NEW JERSEY, ASSIGNOR TO WESTERN ELECTRIC COMPANY, INCORPORATED, OF NEW YORK, N. Y., A CORPORATION OF NEW YORK.

CABLE-REELING APPARATUS.

1,396,721.      Specification of Letters Patent.      Patented Nov. 15, 1921.

Application filed June 24, 1919. Serial No. 306,462.

*To all whom it may concern:*

Be it known that I, GEORGE F. ATWOOD, a citizen of the United States, residing at Newark, in the county of Essex, State of New Jersey, have invented certain new and useful Improvements in Cable-Reeling Apparatus, of which the following is a full, clear, concise, and exact description.

This invention relates in general to cable reeling apparatus and more particularly to a winch so arranged as to permit the rapid paying-out and reeling-in of a cable without causing undue wear of the cable.

In connection with the detection of underwater sounds by means of devices towed behind the vessel, it is common practice to provide a towing cable which includes the electrical conductors necessary for the operation of the detecting and coöperating apparatus. In order to detect the faint sounds satisfactorily, it is desirable that the detecting device have relatively little motion with respect to the surrounding water but at the same time it is also desirable to interfere with the speed of the towing vessel as little as possible. It has been found possible to meet these conditions by the use of a winch which permits paying-out the towing cable at a speed approximating that of the towing vessel so that the speed of the towed device through the water is small. When it is desired to take measurements, the engines are stopped and the cable is paid-out rapidly, so that it is often possible to make the necessary measurements before the vessel loses appreciable headway. However, when following such a procedure, it is very necessary to pay-out the cable rapidly and to take every precaution to prevent the cable from becoming kinked as it is drawn from the reel. As soon as the necessary measurements are taken, the vessel again proceeds at full speed and the towed device is hauled in. The pull on the cable under this condition is very appreciable and if allowed to extend to that portion of the cable which is being wound on the reel would cause severe abrasion and cutting of the cable.

Again in connection with cables used for anchoring captive balloons, it is of advantage to use conductors in the cable for the necessary systems of communication and it is desirable to provide a means for hauling-in the cable which prevents its being wound upon the drum at a high tension and also to provide means for rapidly paying-out the cable.

It is therefore the object of the present invention to provide a device which makes it possible to pay-out a cable rapidly without danger of causing kinks and a device, the operation of which can be reversed, to rapidly draw in and reel a cable without having the cable under excessive tension as it is wound on the reel.

To attain this object and in accordance with a feature of this invention, there is provided a device provided with a large smooth surface such as a capstan which takes up the pull on the cable and from which the cable is passed to a reel upon which it is wound without being under excessive tension.

Figure 2:
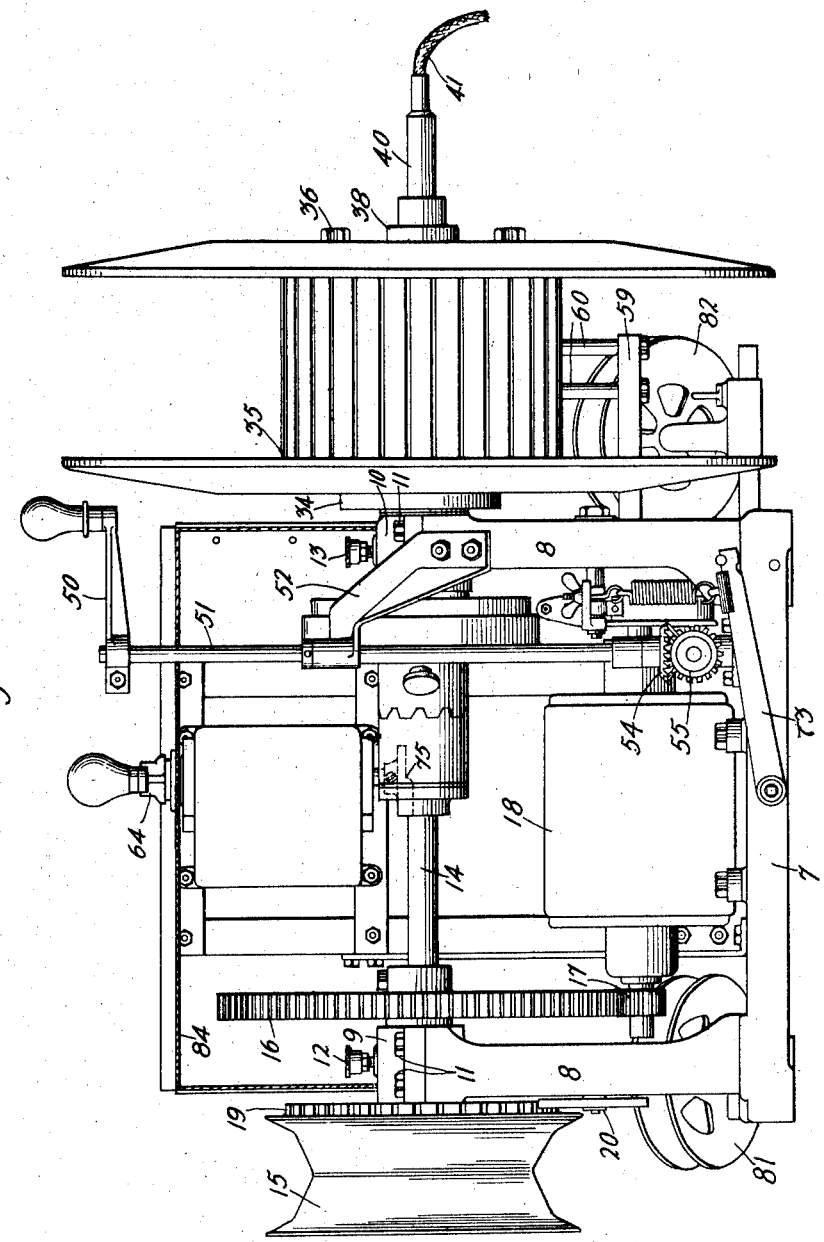
Figure 3:
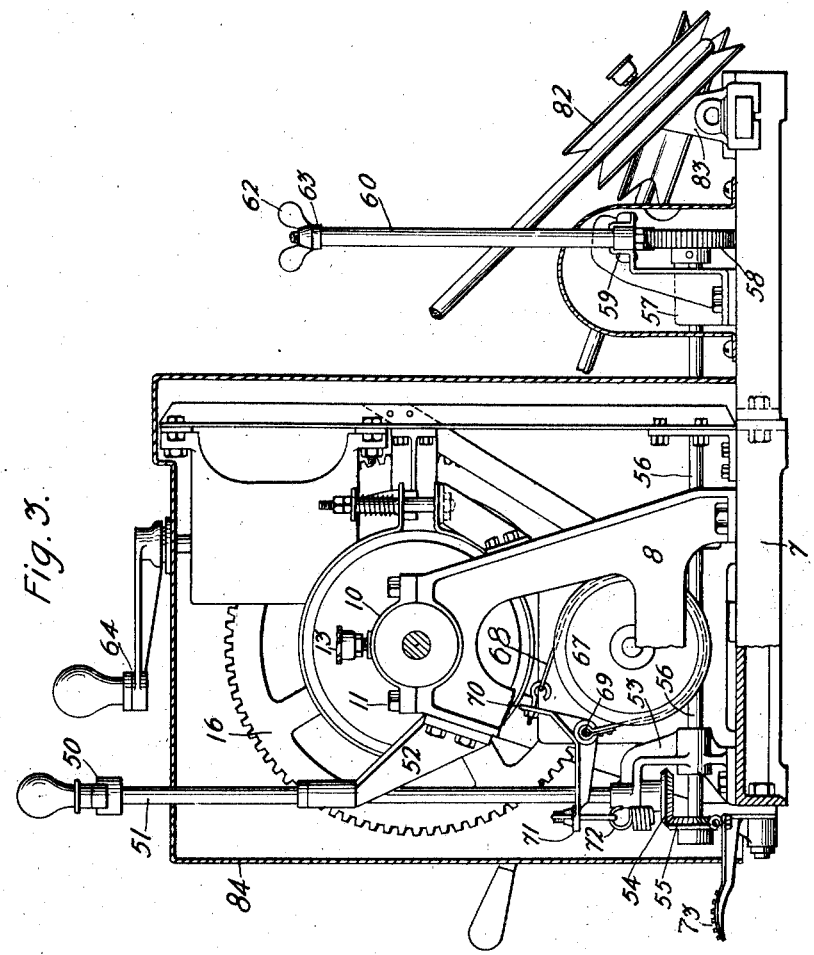
Figure 4:
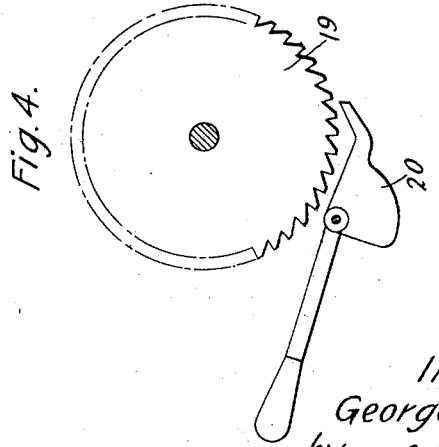

In accordance with another feature of this invention, there is provided a device equipped with the suitable clutches and braking means which permit the rapid handling of the cable irrespective of whether it is being paid-out or hauled-in. These and other features of the invention will be more clearly understood from the following description and the accompanying drawings in which Figure 1 is a plan view of a proposed type of winch equipped with a suitable capstan and a cable reel; Fig. 2 is a front elevation of the winch illustrated in Fig. 1; Fig. 3 is an end elevation of the winch of Fig. 1 but having the reel removed; Fig. 4 is a view showing the ratchet and dog provided for locking the apparatus in a given position; Fig. 5 is a sectional view showing the details of the clutch mechanism whereby the necessary slip is provided between the capstan and the reel and Fig. 6 is a sectional view taken along the lines 6—6 of Fig. 5 looking in the direction of the small arrows and showing the type of one-way clutch which permits a positive drive in one direction only.

Referring now to the drawings, there is provided a base plate 7 provided at either end with A-frames 8—8, which frames are provided with cap pieces 9 and 10 secured to the frames by bolts 11—11. The caps 9 and 10 are provided with oil cups 12 and 13 respectively, which provide lubrication for the shaft 14 which is supported by bearings held between the A-frame 8—8 and the cap pieces 9 and 10. The shaft 14 is provided at one end with a capstan 15 keyed thereto and is positively driven by means of the gear wheel 16 and the pinion 17, the latter of which is directly connected to the shaft of the driving motor 18. Also rigidly attached to the capstan is a ratchet wheel 19 which coöperates with a dog 20 secured to the A-frame 8. This ratchet and dog arrangement which is shown in detail in Fig. 4, is provided for the purpose of taking up the pull of the cable when it is being used for towing. At the middle section of shaft 14, there is provided a clutch mechanism shown in detail in Figs. 5 and 6. This clutch mechanism comprises a one-way rotatable clutch 21 which is keyed or otherwise rigidly secured to the shaft 14. This clutch, a sectional view of which is shown in Fig. 6, engages with the sleeve 22 which in turn engages with the sleeve portion of a frictional cone clutch 23. The beveled surface of this clutch engages frictional members 24—24 which in turn are secured to the cup-shaped member 25 by means of screws 26—26. The member 25 is provided with a sleeve portion 27, the end of which is threaded to engage the small threads on a thrust-nut 28 and upon this nut is carried a thrust ball-bearing 29. A collar 30 of brass or similar material is provided, as shown, to serve as a bearing member for the cone clutch 23, which thus rotates freely about the sleeve portion 27. Collar 30 is provided with a shoulder portion against which the compression spring 31 bears with more or less force, depending upon the adjustment of nut 28 upon the sleeve portion 27. As the nut 28 is moved to the right, the frictional contact between member 23 and the frictional members 24—24 is increased as a result of the increased compression of the spring 31. Hence by changing the position of this nut, it is possible to obtain the desired friction and the resulting amount of slip at the clutch 23. The member 25 has a second sleeve portion 32 extending through the journal bearing 33 and provided with a flanged portion 34 to which a cable reel 35 is secured by means of the bolts 36—36. The flange 34, to which is secured the cable reel 35, rotates freely about the shaft 14 and is driven through the medium of the one-way clutch 21 and the frictional clutch 23. The reel 35 comprises a flanged casting 37 upon which is built up a reel of the customary type including an annular plate 66. To this plate, secured by screws or otherwise, is the metal hub 38 upon which is mounted a plurality of contact springs 39—39 insulated from each other and from the various portions of the winch and reel and to which the cable conductors are securely fastened preferably by soldering. This hub member 38 is adapted to receive a connecting plug 40 of the well-known types by means of which connections are made to the cable 41 extending to the listening apparatus. When desired, a supporting member 42 may be provided, as shown for example in Fig. 5, for supporting this plug.

The one-way frictional clutch 21 comprises a toothed member 43 which is rigidly secured to the shaft 14 by means of a set screw 44, and a plurality of loosely mounted pins 45—45 which serve as a coupling between the toothed member 43 and the annular member 46. This member 46 is provided with a flanged portion and is secured to the end of sleeve 22 by means of screws 47—47. In order to insure a maximum amount of wear for this clutch, the pins 45 and the annular member 46 are preferably of case hardened steel. As the shaft rotates in the direction indicated by the arrow, pins 45 are wedged between members 43 and 46 serving as a rigid coupling and causing the positive rotation of sleeve member 22. Upon rotation of the shaft in the opposite direction, the pins take up positions at the base of the teeth of member 43 and under this condition there is sufficient clearance to allow the free rotation of member 43 without causing the rotation of sleeve 22. In order to prevent end motion of pins 45, the side plates 65—65 are provided as shown. The sleeve member 22 serves as a continuation of the sleeve portion of member 23, two separate parts being provided in order to permit access to the adjusting nut 28 for adjusting the compression of spring 31. Members 22 and 23, where their surfaces come in contact, are provided with intermeshing teeth, as shown more clearly in Fig. 2, and an end cap 48 is secured to the shaft by means of the set screw 49 to prevent these parts from separating.

To provide a comparatively even lay of cable upon the reel, there is provided a traversing arrangement which comprises a handle 50 which is secured at right-angles to shaft 51 extending through the bearing brackets 52 and 53 which in turn are secured by bolts to A-frame 8 and the base plate 7 respectively. The lower end of shaft 51 is provided with a beveled gear 54 which engages with a similar beveled gear 55 rigidly secured to the shaft 56 which is journaled in the bracket 53 and also in a bracket 57, the latter of which is secured to the base plate 7. The opposite end of shaft 56 terminates in a spur gear 58 which is adapted to engage the teeth of rack 59. At the end of rack 59 there are provided two guide pins 60—60 between which the cable 61 passes. One of these guide pins is provided with a wing nut 62 which holds in position a strap member 63 joining the two pins and makes it unnecessary to thread the cable in position. By means of this mechanism it is possible to distribute the cable upon the reel by proper manipulation of the handle 50.

In order to properly control the operation of driving motor 18, there is provided a controlling mechanism of any of the well-known types operable by means of the handle 64, by means of which the speed and direction of rotation of the motor is regulated. At one end of the motor shaft, there is provided a brake arrangement which permits a gradual increasing of the towing tension. This brake arrangement comprises a pulley member 67 about the perimeter of which is provided a brake band 68 fixedly anchored at the end 69. The other end of this brake band is secured to the end of arm 70 of a bell crank lever. At the other end 71 of this lever, there is adjustably secured a spring 72 which is attached at its other end to a pivoted foot pedal 73. In Fig. 3 of the drawing, this spring is shown broken away in order to more clearly show other parts of the mechanism. The handle 64 of the motor controller coöperates with a cam wheel 75, the cam surface of which engages a roller 76 secured in place on a lever 77 pivoted on the fixed bracket 78. The opposite end of lever 77 engages a brake band 79 which encircles cup member 25 of the friction cone clutch. Between the brake band 79 and the member 25, there is provided a frictional lining material which preferably comprises an asbestos brake lining 80. Upon the movement of the handle 64 the cam surface of wheel 75 operates the lever 77 to cause the brake band 79 to increase the grip upon the member 25.

To guide the cable in its movement between the capstan and the reel, there is provided a guide pulley or idler 81 which is free to rotate about the pin secured at one corner of the base plate 7. A second idler 82 is mounted upon a bracket 83 which in turn is secured to the base plate 7. The mounting of this idler upon the bracket 83 is made adjustable in order to provide more satisfactory operation with reels of different widths. A sheet metal casing 84 is provided, as shown, to inclose the various clutch mechanisms to protect the moving parts, and a second sheet metal casing 85 is also provided to inclose the rack and pinion portions of the traversing arrangement.

The operation of the device, assuming the cable to be already wound in place on the reel 35 is as follows:

When it is desired to pay-out the cable, the motor control handle 64 is turned to the left, in which case the direction of rotation of the driving motor 18 is such that the capstan 15 is rotated positively in a counter-clockwise direction looking in the direction toward the end of the device upon which the capstan is mounted. Since the diameter of the outer turns of the cable 61 upon the reel 35 is very much greater than the diameter of the capstan 15 it is necessary that the reel rotate at a much lower speed than the capstan. Under this condition, the reel is caused to rotate by the tension of the cable 61 as it passes over the idlers 81 and 82 since the one-way clutch 21 permits the free rotation of member 25 on the shaft 14. As a result of the moving of handle 64 to the left, the lever arm 77 which is actuated by the cam wheel 75 causes the friction brake 79 to engage the member 25 through the medium of brake lining 80 and to thereby cause a drag of a sufficient amount to provide the required slippage at the friction clutch, whereby the cable passes between the reel and the capstan without danger of becoming kinked.

When the towing device has been let out the desired distance and it is desired to stop further paying-out of the cable, the arm 64 is brought to a neutral position and pressure is simultaneously placed on the foot pedal 73 which functions to cause a braking action on the pulley 67 rigidly connected to the shaft of driving motor 18 and gradually brings the capstan to rest. The dog 20 is then caused to engage the ratchet wheel 19 and take up directly the strain caused by towing.

In winding-in the cable, the controller arm 64 is thrown to the right and simultaneously, the dog 20 is caused to disengage the ratchet wheel 19. With the controller handle 64 turned to the right, the capstan 15 is caused to rotate in a clockwise direction looking at the capstan end of the winch. Under this condition, it is desirable that the tension of the cable, so far as possible, be taken up on the capstan rather than to permit its being transmitted to the reel where it would interfere with the proper reeling of the cable and also cause excessive wear and abrasion. With the shaft 14 rotating in the direction indicated, the one-way clutch 21 positively drives the member 22 through the medium of the friction clutch member 25 to which the reel 35 is rigidly attached. By properly regulating the adjustment of nut 28, the compression of spring 31 can be regulated so that the amount of slippage taking place between the cone clutch 23 and the members 24 is of the right amount to cause the cable 61 to be wound upon the reel 35 at the desired tension.

With the arrangement as described, practically all of the pull of the cable when towing-in may be taken up at the capstan, the surface of which is so arranged as to produce the minimum amount of wear on the cable and from this point the cable is passed at a reduced tension to the reel where it is wound in place evenly by means of the transversing arrangement provided. However, when it is desired to pay-out the cable, the arrangement permits this being done at the speed of the rotation of the capstan but without danger of causing kinks in the cable due to variations in the pull of the cable and also due to variations in the diameter of the turns of the cable as wound upon the reel. Moreover, the automatic means provided upon the motor for gradually diminishing the pull as the motor is stopped prevents the placing of excessive strain upon the cable when the paying-out operation is stopped.

What is claimed is:

1. In a mechanism for reeling and unreeling a cable, a rotatable shaft, means for rotating said shaft in either direction, a capstan securely fixed at one end of the shaft, a cable reel rotatably mounted at the other end of the shaft, means intermediate said capstan and reel for changing the speed of rotation of the reel with respect to the capstan, and a controlling device operable to control the speed of rotation of said shaft and simultaneously to vary the speed ratio between the shaft and reel.

2. In a mechanism for reeling and unreeling a cable, a rotatable shaft, means for rotating said shaft in either direction, a capstan securely fixed at one end of the shaft, a cable reel rotatably mounted at the other end of the shaft, means intermediate said capstan and reel for changing the speed of rotation of the reel with respect to the capstan, and a controlling device operable to control the speed of rotation of the shaft in either direction and to automatically apply a braking force to said reel when operating in a direction for unreeling the cable.

In witness whereof, I hereunto subscribe my name this 16th day of June A. D., 1919.

GEORGE F. ATWOOD.